United States Patent [19]

Letize et al.

[11] 3,922,511

[45] Nov. 25, 1975

[54] SPECIFIC GRAVITY MONITOR

[75] Inventors: Raymond A. Letize, Danbury; James A. Johnson, Litchfield, both of Conn.

[73] Assignee: MacDermid Incorporated, Waterbury, Conn.

[22] Filed: May 3, 1973

[21] Appl. No.: 356,771

[52] U.S. Cl. .................... 200/84 C; 73/448; 73/453

[51] Int. Cl.[2] .................... H01H 35/18

[58] Field of Search .......... 200/84 C; 73/448, 453; 136/182; 137/91

[56] References Cited

UNITED STATES PATENTS

| | | | |
|---|---|---|---|
| 2,078,977 | 5/1937 | Samiran | 73/448 |
| 2,118,558 | 5/1938 | Hanson et al. | 73/453 |
| 2,264,038 | 11/1941 | Vigren et al. | 200/84 C |
| 2,845,799 | 8/1958 | Emanuel et al. | 73/448 |
| 3,258,968 | 7/1966 | Woodcock | 200/84 C |
| 3,661,652 | 5/1972 | Uitenbroek | 73/453 |

*Primary Examiner*—David Smith, Jr.
*Attorney, Agent, or Firm*—Steward & Steward

[57] ABSTRACT

Apparatus is disclosed for sensing small changes in the specific gravity of a solution system undergoing change, whereby through periodic withdrawal and replenishment thereof to compensate for chemical reaction taking place within the solution, the specific gravity can be maintained substantially uniform. In the system, a portion of the solution is continuously monitored for specific gravity by a float operated sensor whose effective density is equal to a predetermined minimum specific gravity condition, and whose float volume bears a predetermined minimum numerical ratio to the minimum predetermined specific gravity, the sensor being employed to control operation of a pump which simultaneously withdraws solution which has undergone reaction and reintroduces an equal volume of fresh solution to the reaction site.

2 Claims, 3 Drawing Figures

SPECIFIC GRAVITY MONITOR

BACKGROUND OF THE INVENTION

The invention is concerned with problems of maintaining specific gravity of a solution as nearly constant as possible under conditions where some portion of the solution is caused to react in a treatment site with a material introduced into the solution, thereby changing the solution composition and hence its specific gravity. The problem is commonly encountered in metal etchant systems where an etchant solution is brought into contact with a metal object, as for removal of a portion of the metal, and in which periodic withdrawals of used etchant and replacement with fresh etchant are made in order to approximate a steady-state etching action on the metal.

In the typical manufacture of printed electronic circuit boards by the subtractive method, portions of a copper foil cladding on a nonconductive substrate are temporarily masked to outline a desired circuit pattern, and the blank circuit board is then placed in an etching tank or more commonly in a spray etcher. Etchant solution is pumped from a sump and sprayed over the surface of the board to dissolve away exposed copper foil. After rinsing the board, the temporary masking is removed, leaving a printed conductive circuit of the desired configuration on the nonconductive substrate.

Close control of the etch rate in such an operation is important to obtain sharp outline of the circuit pattern defined by the retained metal foil. This becomes highly critical where miniaturization of the circuit board is important, inasmuch as the width of the retained conductor portions must be minimized, as must also the spacing between such conductor portions. For commercial production, the etching operation is automated in order to be able to handle great numbers of circuit boards in minimum time and with minimum labor.

A variety of metal etchants are in common use, including acid, neutral and alkaline agents. In etching copper, for example, typical etchants used are hydrochloric acid, ferric chloride, cupric chloride, ammonium persulfate, ammoniacal chlorite and ammoniacal cupric chloride. The successful commercial operation of the etching cycle is highly etch-rate dependent, and the etch rate of course depends in turn on the composition of the etchant solution. Continuous withdrawal and replenishment of the etchant solution is uneconomical and impractical, with the result that these systems are generally operated either in batch mode, in which the etchant bath is simply discarded when the etch rate has reached a predetermined minimum level; or replenishment or reconstitution of a portion of the etchant is made on a periodic basis. Obviously if the periodicity of the withdrawal and replacement is too infrequent, there is a wide swing in the rate of etch during the period, which requires manual supervision and thus is not suited for automated operation. In an attempt to even out the rate change and prevent this swing in etch rate, various forms of sensors have been employed to control the addition of new solution. These have utilized photometric as well as gravimetric sensors, but the systems available lack adequate sensitivity to give wholly satisfactory results.

SUMMARY OF THE INVENTION

Since the sensitivity of the means employed in sensing the conditions of the etchant solution is a key to providing good automated control of the etching operation, one of the principal objectives of the present invention is directed to providing a sensor device of the gravimetric type having substantially better response to changes of specific gravity of the etchant solution than has been available heretofore. It is a further objective of the invention to provide a sensor which is of simplified mechanical construction, free of exposed mechanical joints, pivots or the like subject to corrosive attack, friction and thus having poor response. It is a further object to facilitate a means of adjusting the sensor so that it will be operative at any preselected specific gravity value within a given range. It is yet another object to arrange all electrical components of the sensor so as to be totally and permanently sealed, yet enable changes to be made in the selected operating range of the sensor without disturbing the electrical portion of the sensor.

DESCRIPTION OF THE PREFERRED EMBODIMENT

Figure 1:
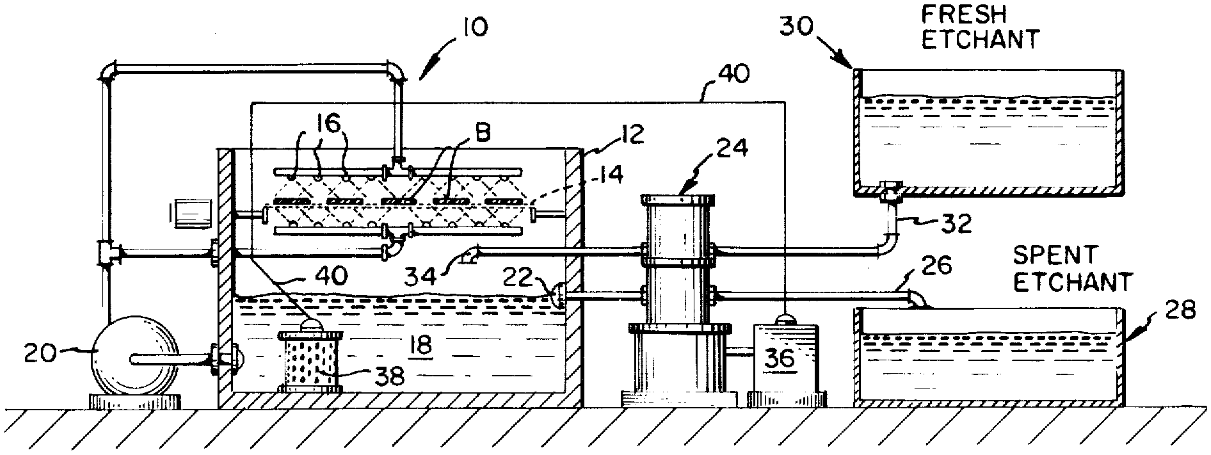
FIG. 1 is a schematic illustration of a typical copper etching system, such as a type commonly employed in producing printed circuit boards, in which a sensor of the invention is incorporated.

The schematic illustration of FIG. 1 represents a continuous copper etching system of the type suitable for producing printed circuit boards from copper clad plastic substrate laminates. Spray etcher 10 comprises a tank or etch chamber 12 through which circuit boards B are carried by conveyor 14 while an etchant solution is sprayed on them from a series of spray heads 16. The etchant solution collects in a sump 18 at the bottom of chamber 12 and is recirculated continuously to spray head 16 by pump 20.

The level of etchant in sump 18 is kept substantially constant by outlet pipe 22. However periodic withdrawals of the etchant are made by one section of a two-section pump 24 connected into outlet pipe 22. The withdrawn solution is then pumped through suitable ducting 26 to a spent etchant collection tank 28. Simultaneously with such withdrawal, another section of pump 24 introduces an equal volume of fresh etchant to the etch chamber from storage tank 30 through duct 32 and delivery nozzle 34. Actuation of pump 24 to provide the withdrawal of used etchant and delivery of fresh etchant is controlled automatically through an electrical control console 36 to which a specific gravity sensor 38 is connected by cable 40. In automatic operation, sensor 38 signals control unit 36 to activate dual pump 24 whenever the specific gravity of the solution increases above a predetermined value, and the pump continues to run until the sensor signals the control unit that the specific gravity of the solution has been lowered to another predetermined value, as the result of withdrawal of used etchant and replenishment with fresh etchant solution.

It is an objective to limit the difference between upper and lower predetermined specific gravities to values corresponding to the withdrawal and replacement of not more than 10 percent by volume of the total volume of etch solution in the sump during any period of operation. It will be apparent that the average rate of etch will be a function of the difference in specific gravity between the maximum and minimum conditions selected and that consequently the smaller the difference in specific gravity, the more closely a steady-state etch rate will be obtained. In a preferred condition of operation, a change of less than 5% of the volume of the solution in the sump is highly to be desired, but this requires a much more reliably responsive gravimetric sensor than has been available heretofore. The sensor unit here described provides a substantial improvement in this respect.

Figure 2:
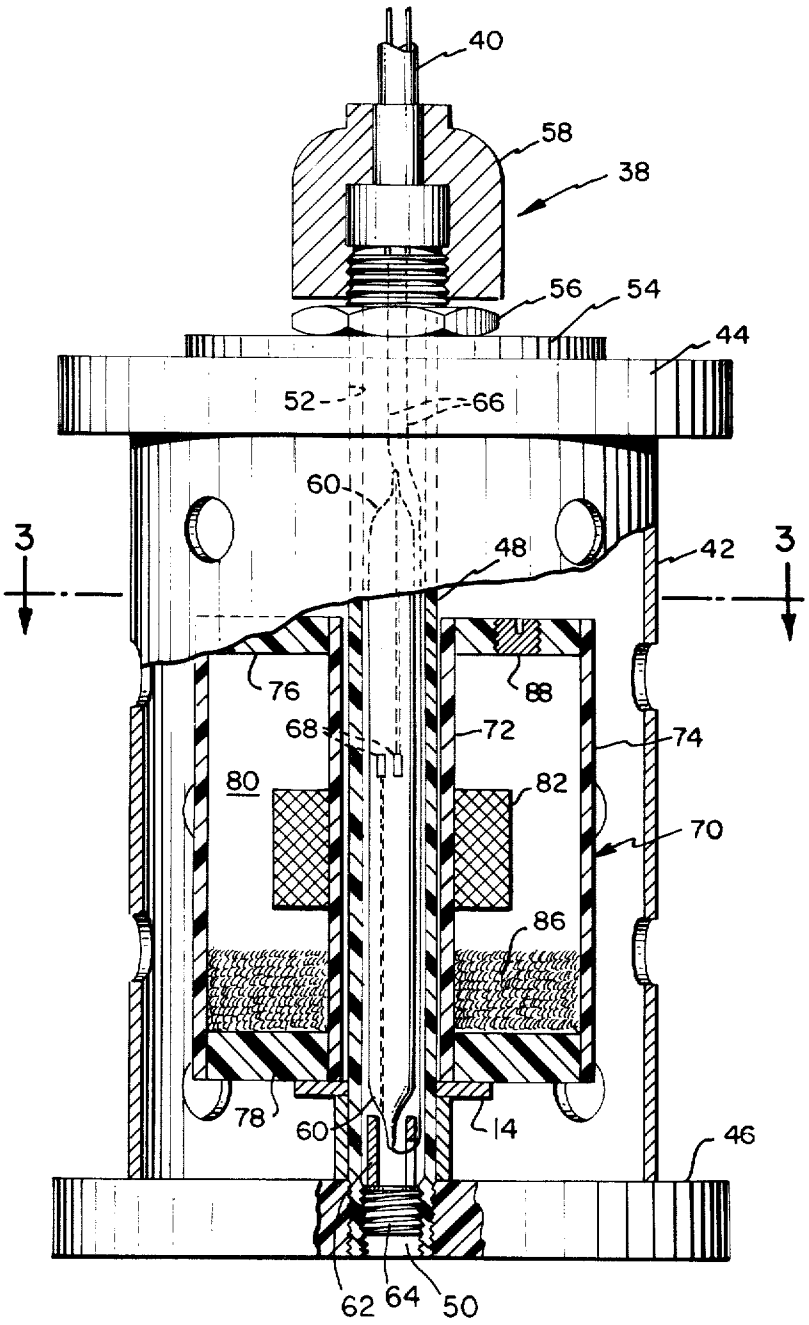
FIG. 2 is an enlarged view of one embodiment of the improved sensor unit, parts being shown broken away and in section to facilitate understanding.

Referring to FIG. 2, specific gravity sensor 38 comprises a cylindrical cage consisting in this case of a foraminous tubular outer wall 42 closed at its opposite ends by discs 44, 46. The assembly of wall 42 and discs 44, 46 is held together by a central tubular sleeve 48 to provide a supporting structure for the operating members of the sensor. One end of sleeve 48 is threaded into a threaded hole 50 in lower end wall 46. The upper end of sleeve 48 is similarly threaded through an aperture 52 in upper disc 44. The upper end of the sleeve projects beyond end wall 44 and receives a washer and locking nut 54, 56, respectively. This projecting upper end of sleeve 48 serves for attachment thereto of a standard water-tight electrical connector plug 58 to which the aforesaid cable 40 is connected.

Sleeve 48 is made of non-magnetic material, as for example extruded plastic tubing, and a conventional hermetically sealed magnetic reed switch 60 is received axially within the sleeve. Reed switch 60 is supported at its lower end on a tubular spacer 62 which in turn is supported by a closure plug 64 threaded into the lower end of sleeve 48. Electrical leads 66 are soldered to the respective projecting terminals of the reed members at each end of the switch, and these leads are connected to terminals in the upper end of the sleeve for engagement by complementary terminals of plug 58. As shown in FIG. 2, reed switch 60 is of the type in which the reed contacts 68 are normally spaced apart, in open-circuit condition, and the switch is adapted to close the electrical circuit whenever a magnetic field is disposed in surrounding relation to both reed members of the switch, causing them to be attracted toward each other against a normal spring bias. This completes the electrical circuit in which the switch is located, in this case the circuit of pump 24 causing it to run.

Figure 3:
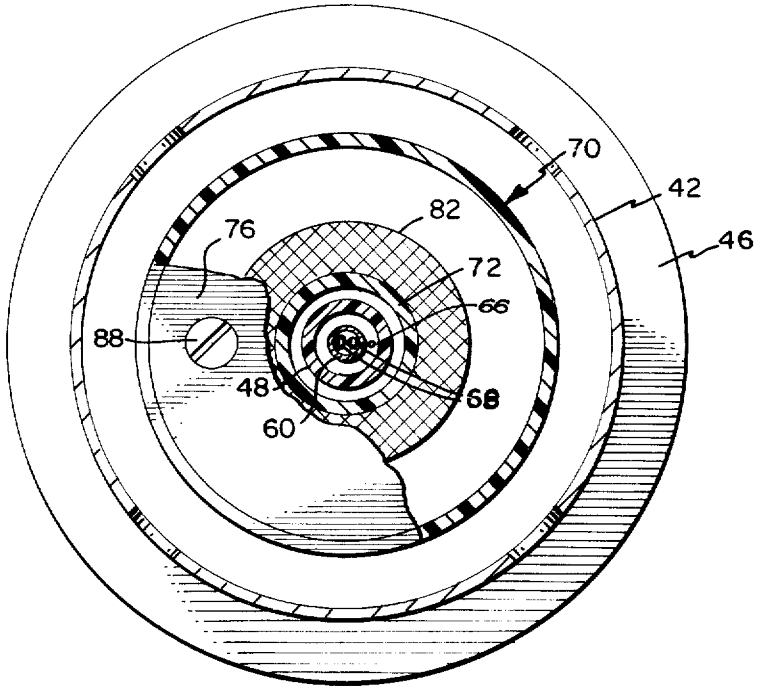
FIG. 3 is a plan view, also partly in section, taken on line 3—3 of FIG. 2, showing details of the float element of the sensor unit.

Sensor 38 includes a toroidal float 70 which is disposed about sleeve 48 as an axis. Float 70 is hollow and as seen in FIGS. 2 and 3 is composed of inner and outer cylindrical walls 72, 74, respectively, which are held in concentrically spaced relation by annular plates 76, 78. These hermetically seal the ends of the float to form a closed chamber 80 in which a ring magnet 82 is suitably secured to the inner wall 72.

Inner wall 72 is of sufficiently larger diameter than sleeve 48 so that the float assembly 70 may slide up and down easily on the sleeve between discs 44, 46 in accordance with changes in the specific gravity of the solution being sensed. A stop nut 84 provided on the lower end of sleeve 48 forms a rest on which float 70 is normally supported until its buoyancy becomes sufficient to cause it to rise on the sleeve. As the float rises, ring magnet 82 is brought into conjunction with the overlap of the reed members of switch 60, thereby causing them to be attracted together to close the electrical circuit.

The buoyancy of float 70 is of course a function of the specific gravity of the solution in which the sensor unit is immersed, so that increases and decreases in specific gravity will cause rising and falling of float 70, respectively, within the limits of its cage.

The weight of float 70 can be changed by adding or subtracting granular material, such as lead shot 86 in chamber 80 through access plug 88 provided in upper end plate 76 of the float. Thus the point at which the buoyancy of float 70 causes it to rise on sleeve 48 can be adjusted to meet a given specific gravity of solution.

In order to provide a sensitivity in sensor unit 38 which is adequate for achieving a virtual steady-state etching rate in the etchant system which has been described before, the sensor is designed to be completely submersed in the sump 18 of an etching chamber. In addition the total weight of float member 70 is carefully correlated with the displacement volume of the float. It will be apparent, of course, that if float 70 is to sink into resting position on stop 84, as seen in FIG. 2, when the sensor unit 38 is submersed, the relationship between the weight of float unit 70 and its total volume must produce an effective density which is at least equivalent to or slightly greater than the specific gravity of the solution. When the gravity of the solution changes, as where its gravity increases due to dissolution of copper metal in the etching process referred to above, the weight of the constant volume of liquid displaced by float 70 increases correspondingly, thus producing a net buoyancy effect upon the float. Provided the volume and weight of the float are properly selected, this will cause the float to rise when a predetermined increase in specific gravity of solution has occurred. For many applications, such as the etching system already described, the desired sensitivity of the sensor should be of an order which will detect a change of around 0.002 in specific gravity of solution. In accordance with the present invention, this can be achieved by correlating two factors. First, that the effective float density is equivalent to a predetermined minimum specific gravity of the solution to be sensed; and secondly, by designing the float volume (expressed in cubic centimeters) to bear a numerical ratio of at least 200:1 to such preselected minimum specific gravity.

By way of illustration, there is given the following practical example of a copper etchant system using ammoniacal cupric chloride etchant solution having a pH of around 9.0 and an initial copper content of 18.8 ounces per gallon, as measured in the sump of the etcher at the start of the operation. Circuit boards to be etched are then run through the spray etcher by the conveyor, as described above, while being sprayed with this etchant solution. Using a 15 gallon pilot sized etcher, a series of different float designs was tested to determine operating limits of the reed switch of the sensor connected to a pump corresponding to pump 24 described above. The results of such tests are tabulated as follows:

TABLE I

| Weight of Float (Grams) | Volume of Float (Cubic Cent) | Etchant Specific Float On | Solution Gravity Switch Off | Sensitivity (Specific Gravity) | Percent Volume Change-Etchant Solution in Sump |
|---|---|---|---|---|---|
| 58.58 | 50.15 | 1.168 | 1.155 | 0.013 | 20% |
| 59.66 | 50.13 | 1.190 | 1.172 | 0.018 | 17% |
| 201.8 | 170. | 1.187 | 1.172 | 0.015 | 13% |
| 285.0 | 240. | 1.188 | 1.176 | 0.012 | 10% |
| 512.0 | 430.2 | 1.190 | 1.186 | 0.004 | 3% |
| 538.0 | 454.4 | 1.184 | 1.182 | 0.002 | 1½% |

As will be seen from the table, adequate sensitivity of the sensor unit is obtained where the float volume, expressed in cubic centimeters, bears a numerical ratio to the selected minimum specific gravity of about 200:1. Better sensitivity of the unit is obtained where the ratio just expressed is higher, with good, practical operation being obtained in the range of about 350:1 to 400:1. Still higher ratios are usable and of course increase sensitivity but at the expense of bulkiness of the unit.

It will be apparent of course that similar results may be obtained for other specific gravity conditions by coordinating the volume and weight of the float member of the sensor with the particular selected specific gravity. As will be seen, the sensor design is such as to facilitate replacement of the float member, in order to change the volume of the float used, without disturbing the reed switch. Similarly, changes in float weight can be effected by adding or subtracting lead shot, for example, to the float chamber, thus maximizing the flexibility of adapting the sensor for different solutions and degrees of sensitivity.

What is claimed is:

1. A float actuated sensor adapted for total submersion in a liquid whose specific gravity is subject to change, said sensor being responsive to such changes in specific gravity above a predetermined minimum value and comprising in combination a magnetically operated read switch, a toroidal float, a permanent ring magnet carried by said float and effective to actuate said switch in certain positions of said float relative to said switch, and an axial support structure for said float, said support structure comprising an elongated tubular sleeve of non-magnetic material, and disc members removably secured to opposite ends of said sleeve and projecting peripherally therefrom, said float comprising a closed hollow toroid, and said ring magnet being fixedly secured therein in concentric relation therewith, said float and magnet being axially received on said sleeve in free sliding relation thereto between said disc members, and said read switch being mounted internally of said sleeve in stationary relation thereto and having conductors leading out through at least one of said disc members for connecting said switch to an external electric circuit, said float and magnet having a displacement volume and combined weight to produce an effective density approximately equal to that of the liquid at said predetermined minimum specific gravity value, said float further having an axial dimension substantially shorter than the length of said sleeve to allow sliding movement of the float to occur between said discs, said total displacement volume when expressed in cubic centimeters bearing a numerical ratio of at least 200:1 relative to said predetermined specific gravity value.

2. A float actuated sensor as defined in claim 1, wherein said numerical ratio of float volume to minimum specific gravity value is from about 350:1 to 400:1.

* * * * *